US007437124B2

(12) United States Patent
Bates et al.

(10) Patent No.: US 7,437,124 B2
(45) Date of Patent: *Oct. 14, 2008

(54) SATELLITE RADIO RECEIVER THAT DISPLAYS INFORMATION REGARDING ONE OR MORE CHANNELS THAT ARE NOT CURRENTLY BEING LISTENED TO

(75) Inventors: Cary Lee Bates, Rochester, MN (US); Eric John Nelson, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/941,477

(22) Filed: Nov. 16, 2007

(65) Prior Publication Data

US 2008/0064325 A1 Mar. 13, 2008

Related U.S. Application Data

(63) Continuation of application No. 09/633,766, filed on Aug. 7, 2000.

(51) Int. Cl.
*H04B 7/185* (2006.01)

(52) U.S. Cl. .................... 455/12.1; 455/3.02; 455/3.06; 455/185.1; 455/186.1; 455/187.1; 455/427; 455/556.2; 348/565

(58) Field of Classification Search ....................... None
See application file for complete search history.

(56) References Cited

U.S. PATENT DOCUMENTS 7,398,051 B1 * 7/2008 Bates et al. ................ 455/12.1

* cited by examiner

*Primary Examiner*—Stephen M D'Agosta
(74) *Attorney, Agent, or Firm*—Martin & Associates, LLC; Derek P. Martin

(57) ABSTRACT

A satellite radio receiver includes a display that displays information regarding one or more channels that are not currently being listened to. For a music channel, this information may include the name of the artist, the song title, time left in the song, etc. For a news channel, this information may include the news currently being discussed, the name of the news program, the time remaining, etc. For a sports channel, this information may include the name of the channel, a description of the sporting event, the time remaining, etc. The preferred embodiments include different ways to select which channels are "favorites" and therefore displayed on the display. One way is to keep track of which channels are most frequently listened to, and to display information regarding those channels.

3 Claims, 4 Drawing Sheets

600

| | Channel | Properties | | |
|---|---|---|---|---|
| | | Song Title | Artist | Time Remaining |
| 610 | 23 | Cold As Ice | Foreigner | 3:07 |
| 620 | 75 | Barracuda | Heart | 1:16 |
| 630 | 12 | If | Bread | 2:25 |

SATELLITE RADIO RECEIVER THAT DISPLAYS INFORMATION REGARDING ONE OR MORE CHANNELS THAT ARE NOT CURRENTLY BEING LISTENED TO

CROSS-REFERENCE TO RELATED APPLICATION

This patent application is a continuation of a patent application of the same title, U.S. Ser. No. 09/633,766, filed on Aug. 7, 2000, which is incorporated herein by reference.

BACKGROUND OF THE INVENTION

1. Technical Field

This invention generally relates to radio receivers and more specifically relates to radio receivers for digital satellite radio.

2. Background Art

For many decades, radio has been an important part of life in the United States, providing countless hours of news, entertainment, and music. Radio receivers typically receive radio signals from local radio stations that transmit their signal over an assigned frequency at or below a prescribed power level. Due to the power limitations imposed on radio transmissions, the range of a radio station is very limited. When a person gets into a vehicle to drive a long distance and tunes to a radio station, the reception on that radio station will typically degrade within an hour or two, forcing the driver to seek a new radio station. There are many wide expanses in the United States that have few people, and hence few (if any) radio stations to choose from. This can become very annoying to a driver that wants to hear news, a sporting contest, a talk radio program, or music while driving.

Recently, two different companies have proposed implementing satellite radio systems that will allow a user to choose from 100 or so radio channels that are all available anywhere within the continental United States. XM Satellite Radio of Washington and CD Radio Inc. of New York are the two companies that have obtained licenses from the Federal Communications Commission (FCC) to broadcast digital radio signals via satellite. Broadcasting CD-quality music from a satellite is not new. DirectTV offers many music-only channels that may be listened to via a television or home theater system that is coupled to a digital satellite dish that is approximately 46 cm (18 inches) across. This system, however, requires a stationary satellite dish pointed at a fixed-position satellite to receive the digital music transmissions, making the system unworkable for car radios. Even if a driver were to somehow mount a satellite dish to a vehicle, the orientation of the dish would be constantly changing, and could therefore not receive music channels from existing fixed position satellites.

The systems implemented by XM Satellite Radio and by CD Radio, Inc. both use multiple satellites to transmit signals that can be received by small car-phone sized antennas. This allows these satellite radio signals to be received by both stationary receivers (such as a radio receiver in a home stereo system) and mobile receivers (such as a radio receiver in a car). The age of digital satellite radio is close at hand. For a small monthly fee of around $10, a subscriber can enjoy up to 100 channels of digital music and other radio programming, many of which do not have any commercials.

One feature of satellite radio is that the artist and song title (or program name/description) are transmitted along with the programming. This allows a satellite radio receiver to display the current channel, as well as the programming being played on the current channel. However, there is currently no way to display any information on a digital radio receiver regarding what is playing on other channels. The prior art requires that a user manually tune to another channel and listen to the program being played to determine if the user wants to remain tuned to that channel. If information regarding other channels were available on the radio display, the user could then decide whether to switch channels if a more favorable program is playing on a different channel. Without a way for a user to tell what is playing on other channels, users will be forced to manually scan channels until a desired program is heard.

DISCLOSURE OF INVENTION

According to the preferred embodiments, a satellite radio receiver includes a display that displays information regarding one or more channels that are not currently being listened to. For a music channel, this information may include the name of the artist, the song title, time left in the song, etc. For a news channel, this information may include the news currently being discussed, the name of the news program, the time remaining, etc. For a sports channel, this information may include the name of the channel, a description of the sporting event, the time remaining, etc. The preferred embodiments include different ways to select which channels are “favorites” and therefore displayed on the display. One way is to select one or more channels that are assigned to preset buttons on the radio receiver. Another way is to keep track of which channels are most frequently listened to, and to display information regarding those channels. The preferred embodiments extend to any and all mechanisms for displaying information regarding one or more channels that are not currently being listened to.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Overview

The preferred embodiments relate to displaying information for non-selected channels to a user when a selected channel is being listened to. In order to understand the preferred embodiments described herein, the prior art for satellite radio broadcasts and receivers is shown in FIGS. 1-3.

Figure 1:
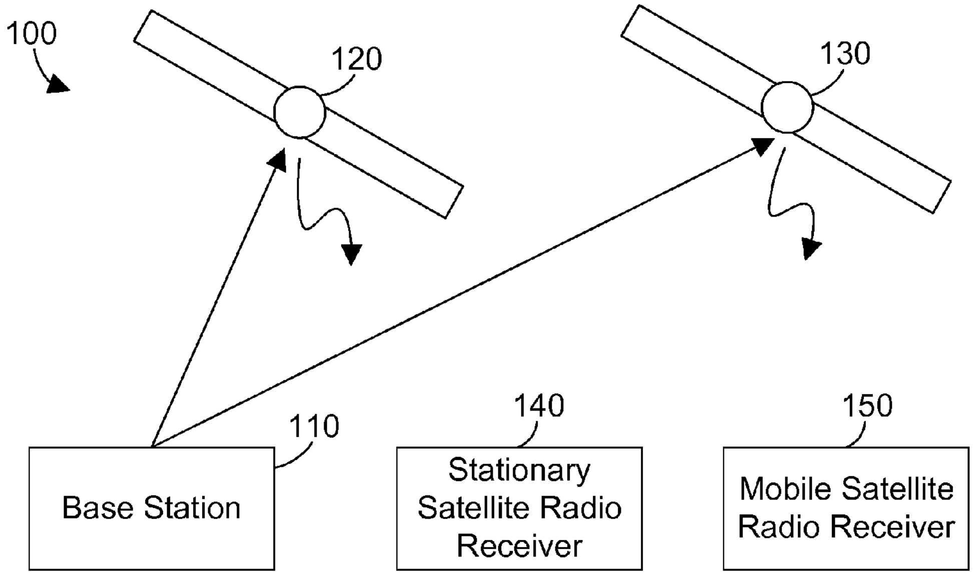
FIG. 1 Prior Art
FIG. 1 is a diagram of a prior art system for broadcasting and receiving satellite radio signals.

Referring to FIG. 1, a satellite radio system 100 includes a base station 110 that transmits programming to one or more satellites, such as satellites 120 and 130. Each satellite has an assigned geographical area to which it broadcasts. Each satellite thus broadcasts many channels of satellite radio received from the base station 110 to its assigned geographical area. These signals can be received by stationary satellite radio receivers such as 140 as well as mobile satellite radio receivers such as 150. An example of a stationary satellite radio receiver 140 is a radio receiver on a home stereo system. An example of a mobile satellite radio receiver is a car radio. In this manner many channels may be broadcast in CD-quality sound to any point within a defined geographical region, such as the continental United States.

Figure 2:
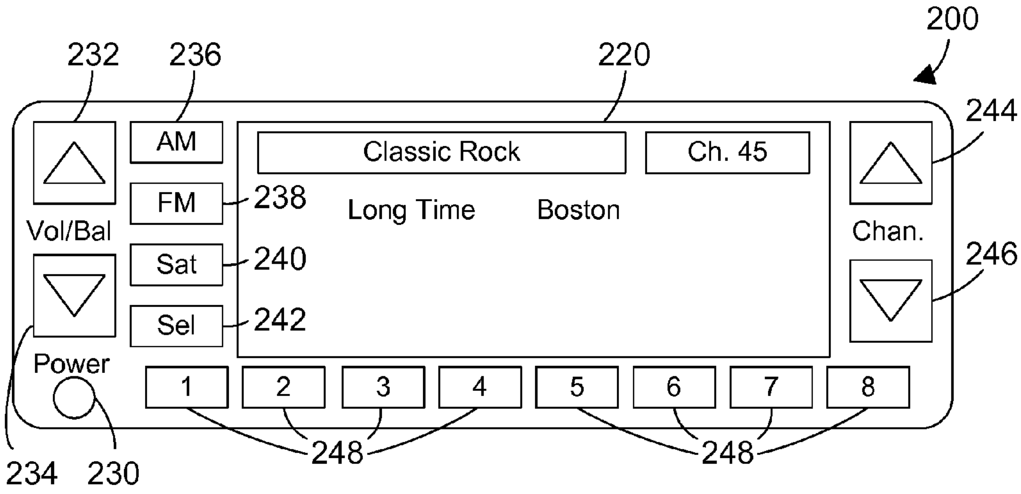
FIG. 2 Prior Art
FIG. 2 is a front view of a suitable satellite radio receiver according to the prior art.
Figure 3:
FIG. 3 Prior Art
FIG. 3 is a block diagram showing information included in a satellite radio signal according to the prior art.

Referring to FIG. 2, a satellite radio receiver 200 in accordance with the prior art includes keys (or buttons) that change the function of the receiver 200, as well as a display 220. The buttons include a power button 230, a volume up button 232, a volume down button 234, an AM radio select button 236, an FM radio select button 238, a satellite radio select button 240, and a select button 242 for selecting different modes, such as balance and fade adjustment, etc. Also included is a channel up key 244, a channel down key 246, and numerous channel preset keys 248. Note that the buttons may take on different functions according to the selected mode for the satellite radio receiver 200. For example, if balance mode is selected using Sel button 242, the volume up and down buttons 232 and 234 may be used to adjust the balance between the left and right speakers.

Display 220 includes information about the channel currently being listened to. For the example of FIG. 2, the channel is 45, which is a classic rock channel. Display 220 also includes information regarding the current radio program being played. In the example of FIG. 2, the name of the song being currently played on the satellite radio receiver 200 is “Long Time” by the group “Boston”. Satellite radio receiver 200 thus provide to the user a visual indication of what is currently playing on the selected channel.

Displaying information regarding the current radio program is possible because the digital satellite radio signals include identifying information that identifies the current program on each channel. For example, FIG. 3 shows that identifying information 310 is transmitted along with the radio program 320. The satellite radio receiver 200 processes the identifying information, and generates from the identifying information a message that is displayed to the user on display 220. The messages “Classic Rock”, “Long Time” and “Boston” are all messages that are generated from the corresponding identifying information 310 that is transmitted with the radio program 320 for the song “Long Time”.

The preferred embodiments improve upon the prior art by providing a visual display of radio programs that are playing on other channels, along with a visual indication of time remaining for each program. This information allows the user to decide whether or not to change channels without having to change the channel, listen to see if the program playing is one the user wants to listen to, change the channel again, etc.

DETAILED DESCRIPTION

Figure 4:
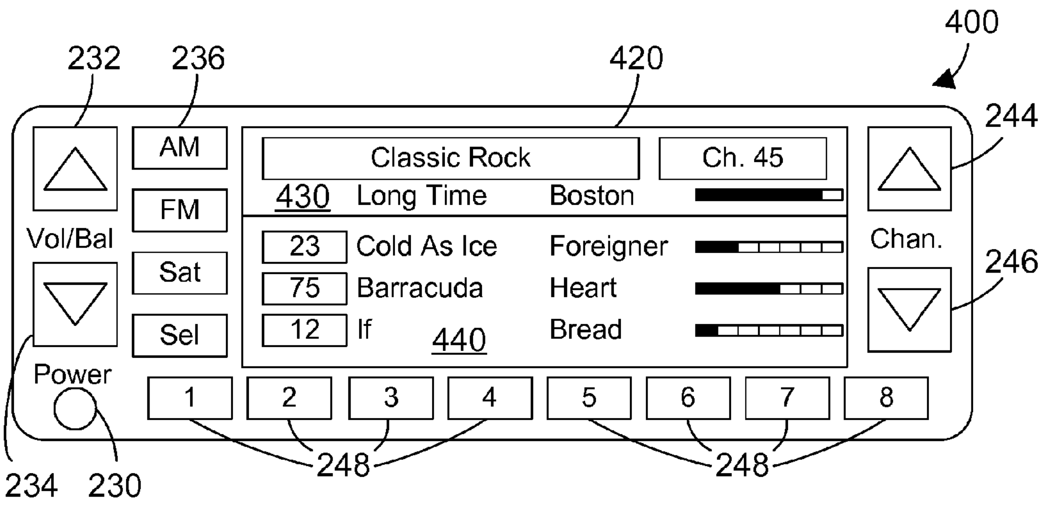
FIG. 4 is a front view of a satellite radio receiver in accordance with the preferred embodiments.

Referring now to FIG. 4, a satellite radio receiver 400 in accordance with the preferred embodiments includes the same buttons as on the prior art receiver 200 of FIG. 2 for the sake of convenience and consistency in discussing the differences between the prior art and the preferred embodiments. Note that the reference designators 238, 240 and 242 are not shown in FIG. 4 due to space constraints. The primary difference between prior art receiver 200 and receiver 400 is a display 420 that includes information for one or more channels that are not currently being listened to (i.e., that are not the current channel). Note that this receiver 400 could be a stationary receiver (e.g., for a home stereo system) or a mobile receiver (e.g., for a car stereo system). For the specific example in FIG. 4, display 420 displays the same information for the current channel as was displayed in the prior art display 220 in FIG. 2 in a portion of display 420 referred to as the “selected channel display” 430. In addition, display 420 also includes information for three channels that are not the current channel in a different area of display 420 referred to as the “non-selected channel display” 440. The information in the non-selected channel display 440 shows that the song “Cold As Ice” by the group “Foreigner” is currently playing on channel 23, that the song “Barracuda” by the group “Heart” is currently being played on channel 75, and that the song “If” by the group “Bread” is currently being played on channel 12. In addition, display 420 includes indicators that show how much time remains in the radio program (or song) being played on each channel. For the specific example in FIG. 4, the time remaining is displayed on a bar chart, where the filled in bars indicate the portion of the song that has played, while the unfilled bars indicate the portion of the song that has not yet played. Thus, we see from the horizontal bar charts in display 420 that the song “Long Time” on the current channel, channel 45, is almost over; that “Cold As Ice” on channel 23 has been playing a short time; that “Barracuda” on channel 75 is over half done; and that “If” on channel 12 has just started. By providing information on display 420 regarding the programming on other channels that are not currently selected, a user can then determine whether to change to a different channel without manually changing to the channel and listening to see if anything good is on. Note that the exact format of the digital satellite radio signal may vary widely within the scope of the preferred embodiments, which extend to any format that includes identifying information that describes the radio program being transmitted.

Of course, the time remaining in a radio program can be displayed in ways other than a bar chart. For example, an empty circle could gradually fill in as a program progresses. Numeric indicators may indicate the minutes and second remaining in the radio program. The preferred embodiments expressly extend to any way to visually indicate the progress of a radio program to a user on a display. Note that the preferred embodiments also indicate the progress of a radio program for the current channel, which is not shown in the prior art.

The term “radio program” is used very broadly herein to refer to any program or portion of a program that may be transmitted via radio signals. A radio program may include a song, a talk show program, a sporting event, a news report, etc. In addition, a radio program may be broken down into sub-parts that are considered separate entities. For example, the nightly news may be a half hour radio program, but may be broken up into headline news, world news, financial news, weather, and sports. Each of these sub-parts (or segments) could be displayed as separate programs on display 420 so a user can tell the progress of each individual segment, rather than just showing how much time is left in the entire news program. In addition, a commercial advertisement could have the information "commercial" as the program name, or could include a designator for a commercial along with the name of the advertiser and a short message regarding the product being advertised.

The selection of a non-selected channel to become the current channel can be performed in any suitable way. One such way is to press the Sel button 242 to highlight the top non-selected program. Pressing the channel down button 246 could cause the highlight to more down to the next selection. Pressing the Sel button 242 again could then select the highlighted channel as the current channel. Another suitable way for a user to select a non-selected channel as the current channel is to provide a touch screen on display 420 that allows a user to simply touch the non-selected channel that he or she wants to become the current channel. Of course, other ways may be used to select a non-selected channel to become the current channel within the scope of the preferred embodiments.

Figure 5:
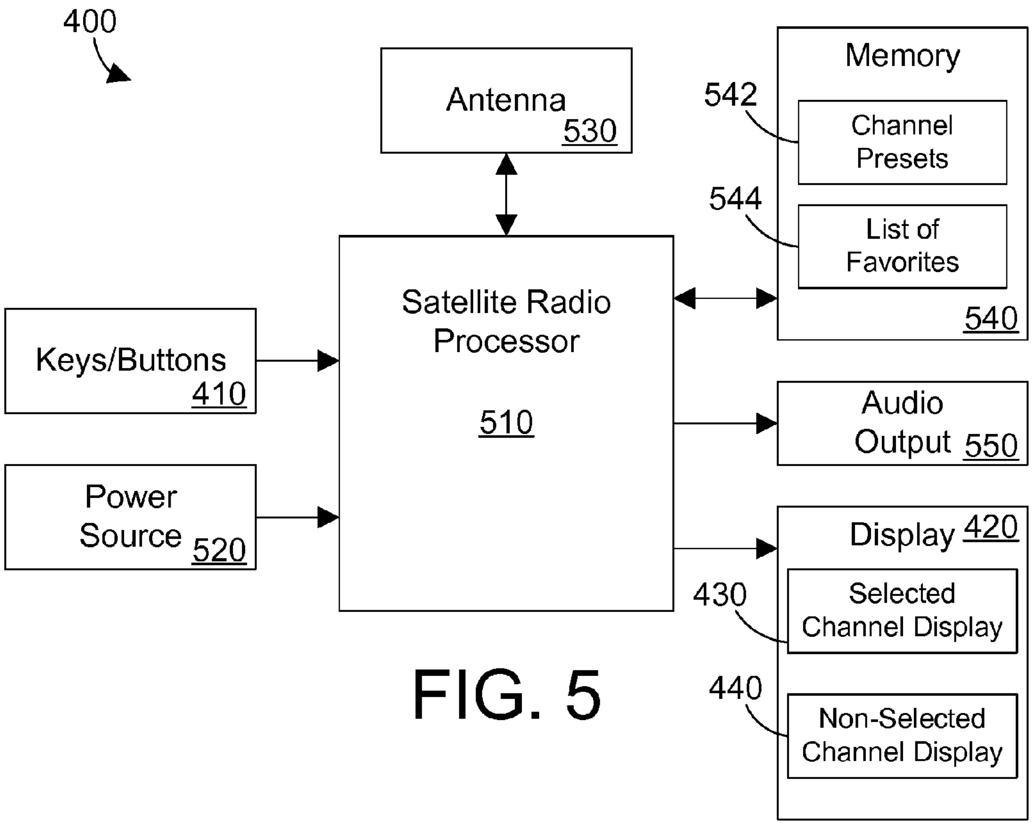
FIG. 5 is a block diagram showing components of the satellite radio receiver of FIG. 4.

Referring now to FIG. 5, satellite radio receiver 400 includes a satellite radio processor 510 coupled to keys/buttons 410, a power source 520, an antenna 530, a memory 540, an audio output 550, and display 420. The keys/buttons 410 are the various keys and buttons that control the function of satellite radio receiver 400, including the buttons shown in FIG. 4. The power source 520 is any suitable power source. For stationary satellite radio receivers, the preferred power source is line power received from plugging a power cord into a standard power receptacle. For portable satellite radio receivers, such as those located in vehicles, the preferred power source is 12 volt DC power from the vehicle's electrical system.

Antenna 530 is an antenna that is designed to receive satellite radio broadcasts from satellites. The prior art expects that a suitable antenna will be the size of antennas used for car phones. Antenna 530 is preferably the same as a prior art antenna for receiving satellite radio broadcasts from a satellite, but of course could be different, so long as the antenna 530 is capable of receiving satellite radio broadcasts from satellites.

Memory 540 includes channel presets 542 and a list of favorite channels 544. Channel presets 542 are the channels that are assigned to the preset buttons 248 of FIG. 4. The channel presets are typically programmed by a user to allow instantly tuning to the channel at the press of a preset button, as is known in the art. List of favorites 544 is a list of the user's favorite channels. This list may be derived from the channel presets 542, may be programmed by the user, or may be determined by satellite radio processor 510 according to which channels are the most listened to. If we assume that the display 420 can show only three non-selected channels as shown in FIG. 4, there are many ways for these channels to be within the list of favorites 544. For example, the three displayed non-selected channels may be determined by the first three preset buttons, 1, 2 and 3. In the alternative, the user could select these three displayed non-selected channels from any of the presets. In another mode, the satellite radio processor 510 keeps track of the hours, minutes, and seconds each channel is played, and places the top three (other than the selected channel) as the non-selected channels to display in display 420. The preferred embodiments expressly extend to any method of selecting which non-selected channels will be displayed on display 420 of satellite radio receiver 400.

Satellite radio processor 510 is also coupled to an audio output 550, which is suitably coupled to an appropriate audio device, such as one or more speakers. The audio output 550 is the radio program that is converted to audio signals so the radio program can be heard by the user. Display 420 includes the selected channel display 430 and the non-selected channel display 440. Display 420 thus provides to a listener information regarding both the current radio program (on the selected channel) as well as radio programs on non-selected channels to aid the user in determining whether or not to switch channels.

Figures 6, 7:
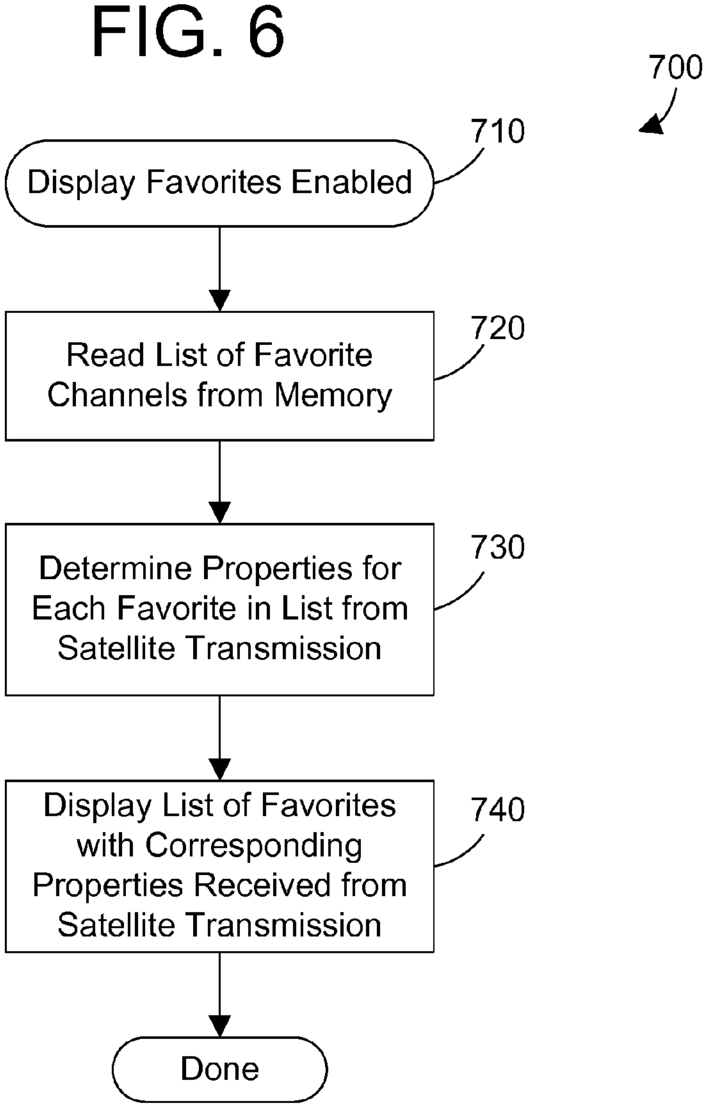
FIG. 6 is a table that includes the list of favorites 544 in FIG. 5 in accordance with the preferred embodiments.
FIG. 7 is a flow diagram that shows the steps that are performed in accordance with the preferred embodiments to display information relating to other channels when a satellite radio receiver is tuned to a selected channel.

Referring to FIG. 6, a table 600 shows one suitable implementation for the list of favorites 544 within memory 540 of FIG. 5. We assume that a channel is specified in the Channel column using any suitable technique, including those discussed above. For the example in FIG. 6, we assume that channel 23 is entered into the first table entry 610, that channel 75 is entered into the second table entry 620, and that channel 12 is entered into the third table entry 630. The satellite radio processor 510 then processes the digital satellite radio signal for each of these listed channels, and generates information for that channel from the identifying information 310 in the transmission that is stored in the appropriate "properties" columns in table 600. The time remaining for each program can be determined from the satellite signal if it includes a running time clock for the program. In the alternative, the satellite radio processor 510 could simply count the time down from a referenced starting point provided in the satellite radio signal.

While table 600 of FIG. 6 includes only three entries 610, 620 and 630, which correspond to the non-selected channels in display 420 of FIG. 4, table 600 (and hence, list of favorites 544) can contain more entries than can be displayed in the non-selected channel display 440. In addition, display 420 can be sized to accommodate any suitable number of non-selected channels within the scope of the preferred embodiments.

FIG. 7 shows the steps in a method 700 that is used in accordance with the preferred embodiments to display information regarding one or more non-selected channels on the display 420 of the satellite radio receiver 400. Method 700 begins when the display of favorite non-selected channels is enabled (step 710). The list of favorite channels 544 is then read from memory 540 (step 720). The properties for each favorite in the list is then determined from the satellite transmission (step 730). Finally, all or a portion of the list of favorites is then displayed to the user with the corresponding properties (i.e., identifying information) received on the satellite radio transmission (step 740). Method 700 thus provides a way to process the incoming satellite radio transmission to generate information that may be displayed on the non-selected channel display 440.

Figure 8:
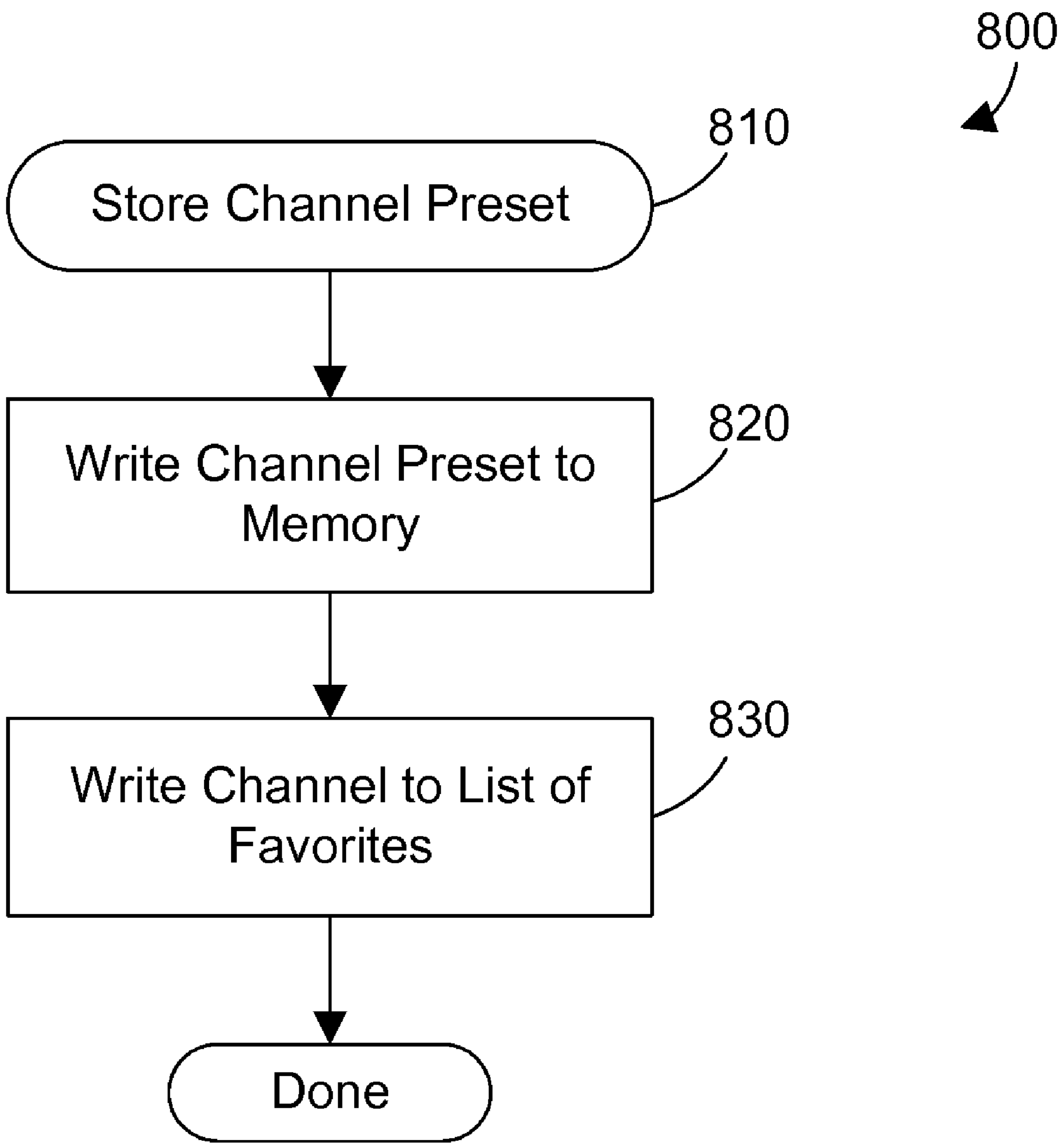
FIG. 8 is a flow diagram that shows the steps that may be performed in accordance with the preferred embodiments to store a channel preset as a favorite channel that may be displayed to a user when the channel is not the current channel.

FIG. 8 shows the steps in one suitable method 800 for generating the channels in the list of favorites 544 in FIG. 5. Method 800 begins when the user requests that a channel preset be stored (step 810). The channel preset is stored to memory (step 820), and the channel is then written to the list of favorites (step 830). In this manner the act of storing a preset can also store that channel in the list of favorites. Of course, other ways exist to generate or modify the list of favorites, as discussed above. The user could manually select certain preset buttons as favorites, or the satellite radio processor could dynamically determine which channels have been listened to the most, and are therefore "favorites".

The preferred embodiments disclosed herein greatly improve the convenience of using a satellite radio receiver by providing visual information regarding radio programs that are not currently being listened to (i.e., that are not on the selected channel). This information allows a user to determine whether or not to switch to a different channel. By also providing the time remaining for each non-selected radio program, the user can also determine the progress of the non-selected radio programs, which allows the user to make more intelligent decisions about when to switch channels. For example, if a good song on a different channel has very little time left, the user may elect not to switch to that channel. The result of the preferred embodiments is a satellite radio receiver that allows a user to enhance his or her listening experience by providing visual information relating to non-selected channels, thus allowing a user to know what are on his or her favorite channels without having to manually tune to the channel and listen to see if there is anything worth listening to on that channel.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. A satellite radio receiver comprising:

a satellite radio processor that receives a plurality of digital satellite radio signals on a plurality of channels, each digital satellite radio signal including a radio program and identifying information related to the radio program, the satellite radio processor outputting audio information corresponding to the radio program in one of the digital satellite radio signals that correspond to a selected channel;

a display within the satellite radio receiver that is coupled to the satellite radio processor and that displays information regarding at least one channel that is not the selected channel, wherein the displayed information is derived from the identifying information for the at least one channel that is not the selected channel; and a memory coupled to the satellite radio processor, the memory containing at least one channel preset and a list of favorite channels, wherein the at least one channel that is not the selected channel is in the list of favorite channels, wherein the list of favorite channels is determined by the satellite radio processor according to which channels are listened to most frequently.

2. A satellite radio receiver comprising:

(1) a satellite radio processor that receives a plurality of digital satellite radio signals on a plurality of channels, each digital satellite radio signal including a radio program and identifying information related to the radio program, the satellite radio processor outputting audio information corresponding to the radio program in one of the digital satellite radio signals that correspond to a selected channel;

(2) a display within the satellite radio receiver coupled to the satellite radio processor that displays:

(2A) information regarding the selected channel, wherein the information regarding the selected channel is derived from the identifying information for the selected channel and includes a title for the radio program corresponding to the selected channel and the time remaining for the radio program corresponding to the selected channel; and (2B) information regarding at least one channel that is not the selected channel, wherein the information is derived from the identifying information for the at least one channel that is not the selected channel and includes a title for the radio program corresponding to the at least channel that is not the selected channel and the time remaining for the radio program corresponding to the at least one channel that is not the selected channel;

(3) a memory coupled to the satellite radio processor, the memory containing:

(3A) at least one channel preset; and (3B) a list of favorite channels, wherein the at least one channel that is not the selected channel is in the list of favorite channels.

3. The satellite radio receiver of claim 2 wherein the displayed information includes artist and song title for the radio program when the radio program comprises a musical radio program.

* * * * *